(12) United States Patent
Kimura et al.

(10) Patent No.: US 7,539,477 B2
(45) Date of Patent: May 26, 2009

(54) WIRELESS LAN APPARATUS AND SEMICONDUCTOR DEVICE

(75) Inventors: Sadahiro Kimura, Kanagawa (JP); Syuji Kubota, Tokyo (JP); Mayuko Ueno, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 612 days.

(21) Appl. No.: 11/269,849

(22) Filed: Nov. 9, 2005

(65) Prior Publication Data
US 2006/0121952 A1 Jun. 8, 2006

(30) Foreign Application Priority Data
Nov. 11, 2004 (JP) ............... 2004-328130

(51) Int. Cl.
H04B 1/16 (2006.01)
H04B 1/04 (2006.01)

(52) U.S. Cl. ............... 455/343.1; 455/572; 455/127.1; 455/127.5

(58) Field of Classification Search ........... 455/574, 455/343.1, 343.2, 343.4, 572, 127.1, 127.5; 370/311, 338, 345
See application file for complete search history.

(56) References Cited

U.S. PATENT DOCUMENTS

2004/0218620 A1 11/2004 Palm et al.
2005/0047356 A1* 3/2005 Fujii et al. ............ 370/311
2005/0047382 A1* 3/2005 Park et al. ............ 370/338
2005/0047386 A1* 3/2005 Yi ......................... 370/345
2005/0190709 A1* 9/2005 Ferchland et al. ...... 370/311
2007/0127403 A1* 6/2007 Lu et al. ................ 370/311

FOREIGN PATENT DOCUMENTS

| JP | 2004-153359 | | 5/2004 |
| JP | 2004-215309 | A | 7/2004 |
| JP | 2004-215311 | A | 7/2004 |

* cited by examiner

*Primary Examiner*—Sonny Trinh
(74) *Attorney, Agent, or Firm*—Dickstein Shapiro LLP

(57) ABSTRACT

A wireless LAN apparatus is disclosed that includes a module group section that is connected to an upper level CPU of an upper level apparatus, an RF processing part that is connected to the module group section, a power reduction instruction dispatching section for dispatching a power reduction instruction, a power reduction instruction receiving section for receiving the power reduction instruction dispatched from the power reduction instruction section, and a power reduction sequence controlling section for controlling power of the module group section in a predetermined order in accordance with the power reduction instruction dispatched by the power reduction instruction dispatching section.

13 Claims, 11 Drawing Sheets

WIRELESS LAN APPARATUS AND SEMICONDUCTOR DEVICE

BACKGROUND OF THE INVENTION

1. Field of the Invention

The present invention relates to a wireless LAN apparatus and a semiconductor device for achieving a step-by-step reduction/restoration of power.

2. Description of the Related Art

In recent years and continuing, the standardization of wireless LAN (Local Area Network) technology according to IEEE 802.11 (Institute of Electrical and Electronics Engineers 802.11) is growing. Such wireless LAN technology is introduced as an alternative of the conventional wired network technology or as a technology that is to coexist with the wired network technology. The functions of the wireless LAN technology are typically attained by employing a device such as a PC card that follow standards of organizations such as the PCMCIA (Personal Computer Memory Card International Association). The device, such as the PC card, is mainly used by being mounted in a personal computer. For the purpose of saving electrical power, the personal computer includes a function of switching off the power supply to various parts in the personal computer when the personal computer is not used for a predetermined period of time.

FIG. 1 is a schematic view of an exemplary configuration of a related art configuration for controlling the power of a wireless LAN function part. In FIG. 1, a PC card 200, which is mounted in a personal computer 100, includes integrated IC chips 201 and 204. The IC chip 201 includes a MAC processing part 202 for performing media access control (e.g. CSMA/CA (Carrier Sense Multiple Access with Collision Avoidance) and a BB (Base Band) processing part 203 for processing BB (Base Band) signals. The IC chip 204 includes an RF (Radio Frequency) processing part for processing high frequency (RF: Radio Frequency) signals. In an operation of transmitting wireless signals from an antenna 206 of the PC card 200, transmission signals travel from a CPU 101 of the personal computer 100 to the antenna 206 via the MAC processing part 202, the BB processing part 203, and the RF processing part 205. In an operation of receiving wireless signals from the antenna 206, reception signals travel from the antenna 206 to the CPU 101 of the personal computer 100 via the RF processing part 205, the BB processing part 203, and the MAC processing part 202.

In an operation for switching off the power of a wireless LAN function part, a signal instructing to switch off the power is transmitted from the CPU 101 of the personal computer 100 to the IC chips 201 and 204 of the PC card 200 at a predetermined timing. In a case of restoring (reactivating) the power, a signal instructing to switch on the power is transmitted from the CPU 101 of the personal computer 100 to the IC chips 201 and 204 of the PC card 200 at a predetermined timing.

Owing to growing demands for increasing the functions of office apparatuses, the wireless LAN function is added not only to the personal computer, but also to office apparatuses such as printers and copy machines. The power of printers and copy machines more often tends to be kept in a continuously on-state compared to the power of the personal computer. Accordingly, there is a considerable demand for reducing the power consumption of office apparatuses such as printers and copy machines, and the demand for reducing the power consumption of the wireless LAN function part thereof is no exception. Furthermore, in a case where a personal computer is not being used, shutting down or switching to a sleep mode may not serve as a problem for the user. Meanwhile, it would be inconvenient to completely switch off the functions of printers and copy machines since a printing job, for example, may be ordered at any time via a network connected to the printers and copy machines.

In controlling the power of the conventional wireless LAN function part of the personal computer 100 shown in FIG. 1, the power of the PC card can only be switched off entirely and switched back on (restored), for example, by having the user perform a prescribed maneuver. Therefore, it is difficult to reduce the consumption of power for the wireless LAN function part.

In order to reduce power as much as possible while maintaining minimal necessary functions, it is possible to control the power for each module included in a wireless LAN apparatus. However, since the wireless LAN function part normally uses multiple clock signals, it is necessary to conceive a control procedure that is able to prevent the multiple clock signals from causing any errors. That is, the wireless LAN apparatus shown in FIG. 1 relies on clocks signals for two circuits (systems) in which one of the clock signals is used for the CPU 101 of the personal computer 100 and the other clock signals is used for the RF processing part 205, the BB processing part 203, and the MAC processing part 202. Therefore, it is desired to conceive a control procedure for reducing and restoring the power of each module while taking the multiple clock signals into consideration.

SUMMARY OF THE INVENTION

It is a general object of the present invention to provide a wireless LAN apparatus and a semiconductor device that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a wireless LAN apparatus and a semiconductor device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a wireless LAN apparatus including: a module group section that is connected to an upper level CPU of an upper level apparatus; an RF processing part that is connected to the module group section; a power reduction instruction dispatching section for dispatching a power reduction instruction; a power reduction instruction receiving section for receiving the power reduction instruction dispatched from the power reduction instruction section; and a power reduction sequence controlling section for controlling power of the module group section in a predetermined order in accordance with the power reduction instruction dispatched by the power reduction instruction dispatching section.

In a wireless LAN apparatus according to an embodiment of the present invention, the module group section may be included in an IC chip having a MAC processing part for conducting media access control, a BB processing part for processing base band signals, and an inside CPU for processing a portion of the workload of the upper level CPU.

In a wireless LAN apparatus according to an embodiment of the present invention, the upper level CPU may be configured to function as the power reduction instruction dispatching section, wherein the inside CPU may be configured to function as the power reduction instruction receiving section and the power reduction sequence controlling section.

In a wireless LAN apparatus according to an embodiment of the present invention, the module group section may further include a first oscillator for transmitting a first oscillator clock signal to the inside CPU, and a second oscillator for transmitting a second oscillator clock signal to the RF processing part.

In a wireless LAN apparatus according to an embodiment of the present invention, the power reduction sequence controlling section may reduce the power of the MAC processing part, the BB processing part, the inside CPU, the first oscillator, and the second oscillator in an order of the MAC processing part, the BB processing part, the second oscillator, the first oscillator, and the inside CPU.

In a wireless LAN apparatus according to an embodiment of the present invention, the power reduction sequence controlling section may restore the power of the MAC processing part, the BB processing part, the inside CPU, the first oscillator, and the second oscillator in an order of the first oscillator, the inside CPU, the second oscillator, the BB processing part, and the MAC processing part.

In a wireless LAN apparatus according to an embodiment of the present invention, the module group section may include a MAC processing part for conducting media access control, and a BB processing part for processing base band signals.

In a wireless LAN apparatus according to an embodiment of the present invention, the upper level CPU may be configured to function as the power reduction instruction dispatching section, the power reduction instruction receiving section and the power reduction sequence controlling section.

In a wireless LAN apparatus according to an embodiment of the present invention, the module group section may further include an oscillator for transmitting a clock signal to the RF processing part.

In a wireless LAN apparatus according to an embodiment of the present invention, the power reduction sequence controlling section may reduce the power of the MAC processing part, the BB processing part, and the oscillator in an order of the MAC processing part, the BB processing part, and the oscillator.

In a wireless LAN apparatus according to an embodiment of the present invention, the power reduction sequence controlling section may restore the power of the MAC processing part, the BB processing part, and the oscillator in an order of the oscillator, the BB processing part, and the MAC processing part.

Furthermore, the present invention provides a semiconductor device used for a wireless LAN apparatus including a power reduction function, the semiconductor device including: a power reduction instruction receiving section for receiving a power reduction instruction dispatched from the wireless LAN apparatus; and a power reduction sequence controlling section for controlling power of a module group section included in the wireless LAN apparatus in a predetermined order in accordance with the power reduction instruction dispatched by the power reduction instruction dispatching section.

In a semiconductor apparatus according to an embodiment of the present invention, the semiconductor apparatus may further include a MAC processing part for conducting media access control, a BB processing part for processing base band signals, and an inside CPU for processing a portion of the workload of an upper level CPU of an upper level apparatus connected to the wireless LAN apparatus.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
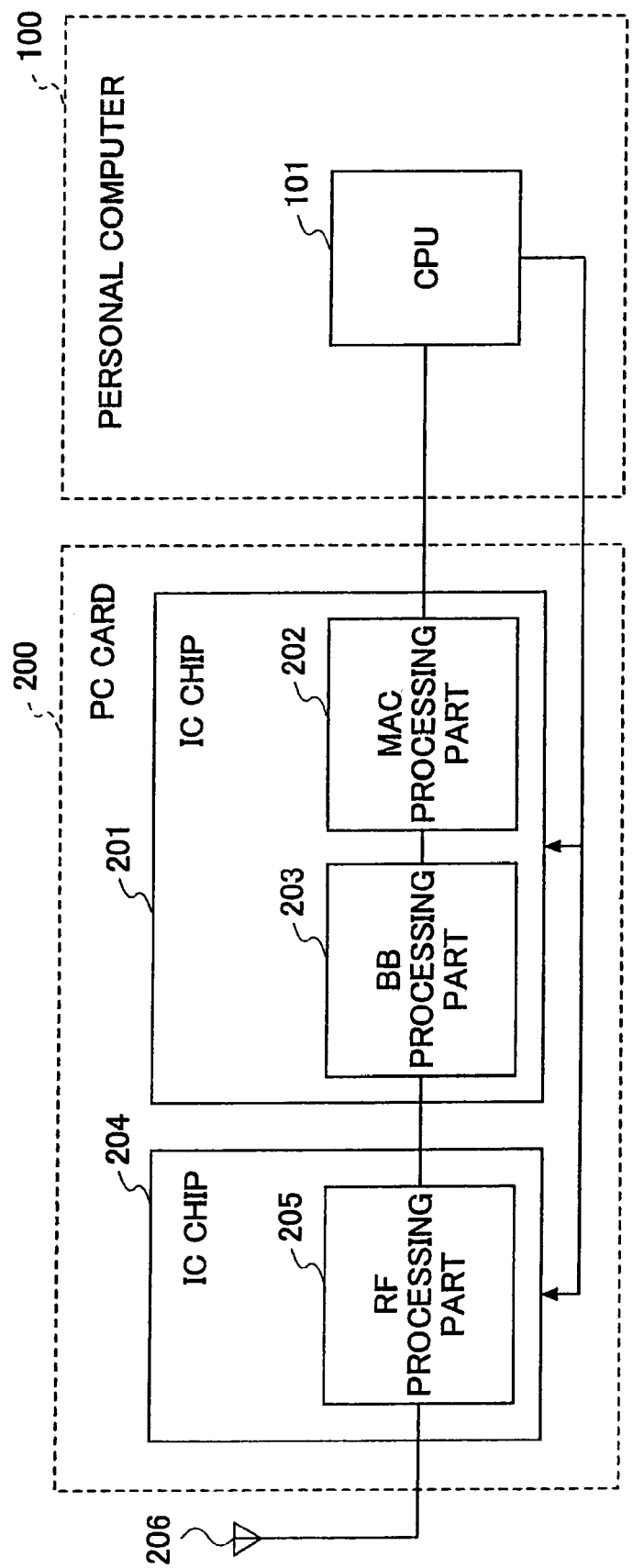
FIG. 1 is a schematic view showing an exemplary configuration of a related art configuration for controlling the power of a wireless LAN function part.
Figure 2:
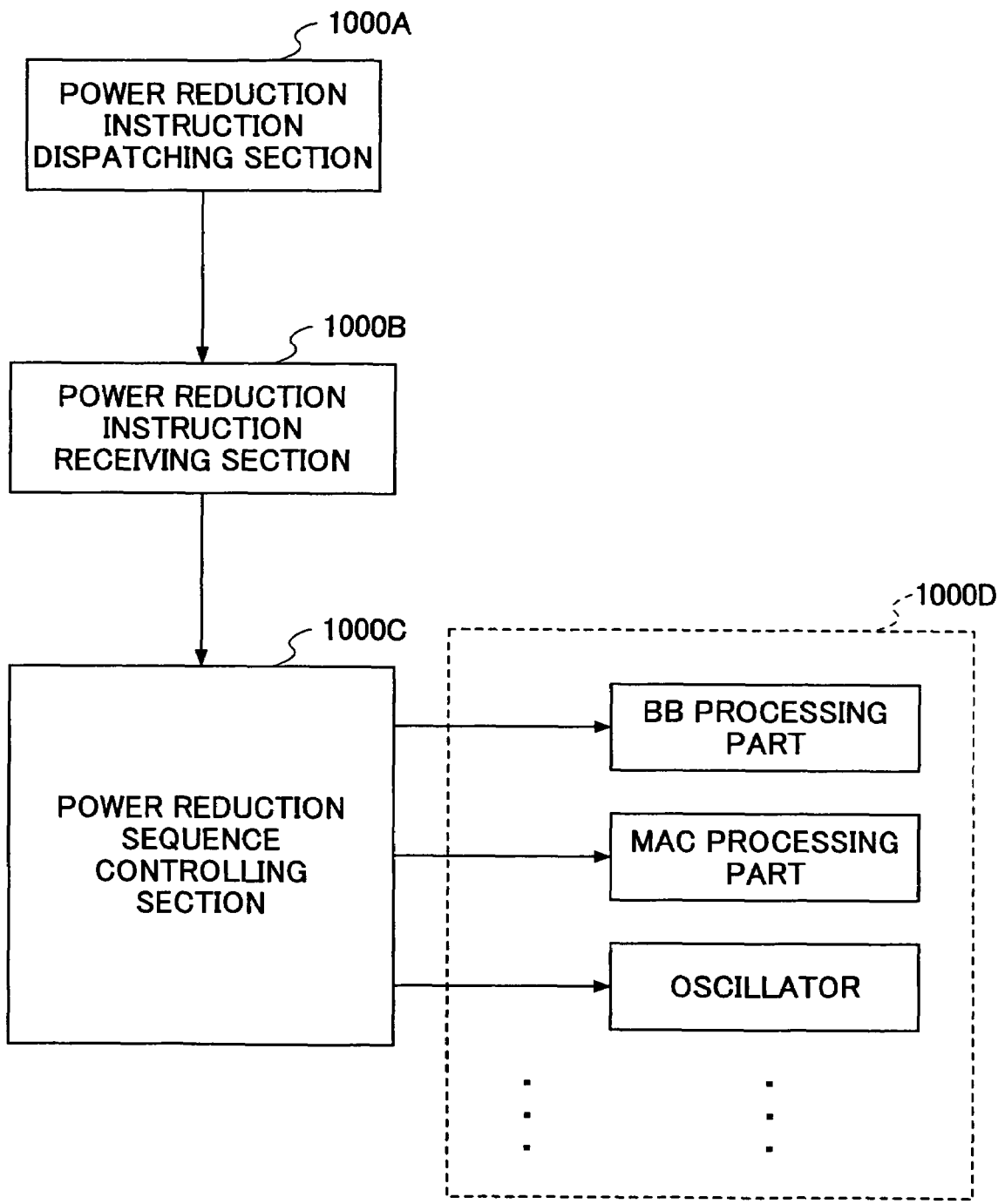
FIG. 2 is a schematic view showing an exemplary basic configuration of a wireless LAN apparatus according to an embodiment of the present invention.

FIG. 2 shows an exemplary basic configuration of a wireless LAN apparatus 1000 according to an embodiment of the present invention for controlling electric power thereof. In FIG. 2, the wireless LAN apparatus 1000 according to an embodiment of the present invention includes a module group section 1000D having multiple modules of the wireless LAN apparatus 1000 that are subject to a power control operation. The modules include, for example, a BB processing part for processing base band signals, a MAC processing part for performing a media access control operation (e.g. CSMA/CA), and an oscillator for transmitting clock signals to each module. The wireless LAN apparatus 1000 also includes a power reduction instruction dispatching section 1000A that dispatches instructions (power reduction instructions) instructing to reduce power so as to save on power consumption, a power reduction instruction receiving section 1000B that receives the power reduction instructions from the power reduction instruction dispatching part 1000A, and a power reduction sequence controlling section 1000C that performs power reduction (according to the power reduction signals received in the power reduction receiving section 1000B) and power recovery in a predetermined order. The arrangement of the above-described sections is further described below.

Figure 3:
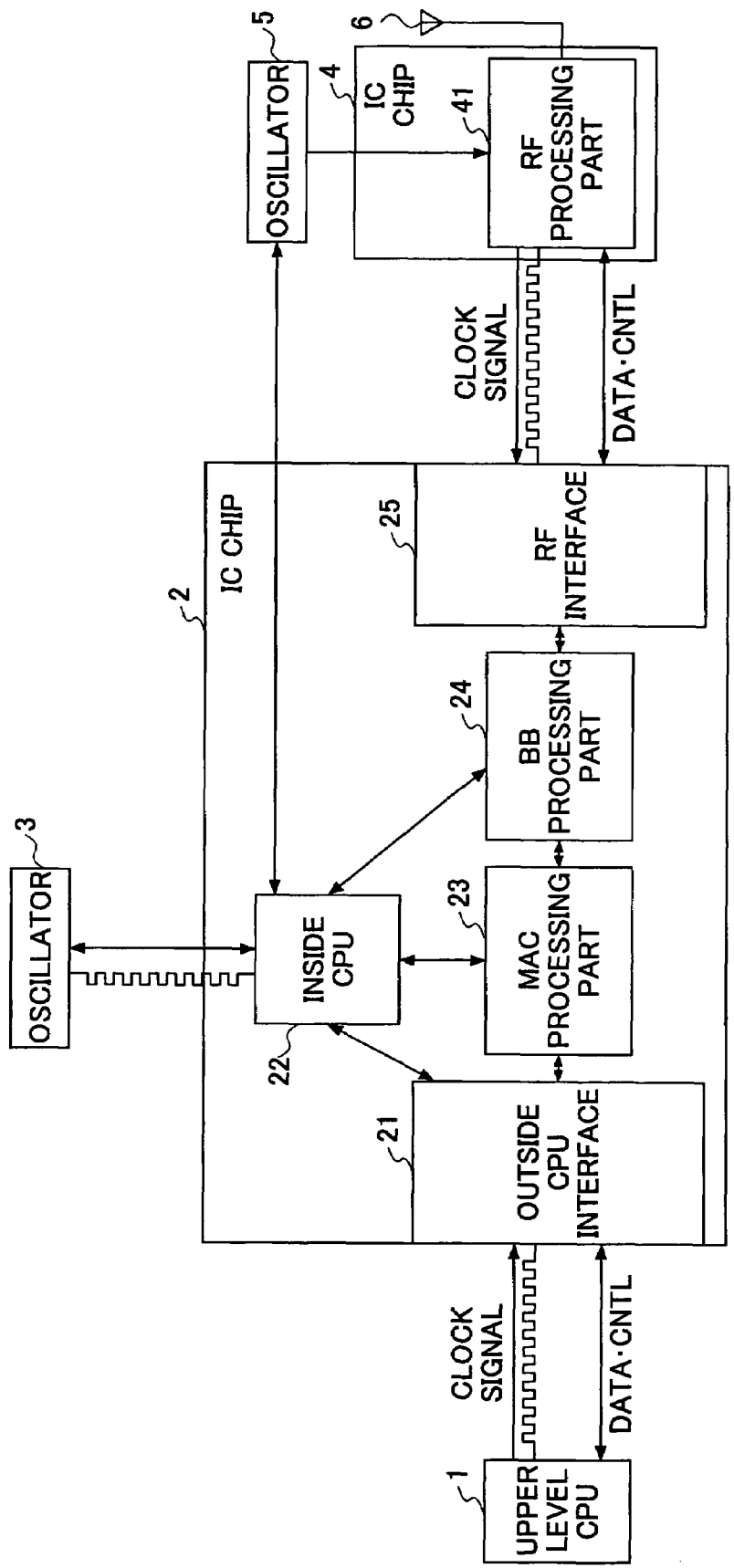
FIG. 3 is a schematic view showing an exemplary configuration of a wireless LAN apparatus according to the first embodiment of the present invention.

FIG. 3 is a schematic diagram showing an exemplary configuration of a wireless LAN apparatus 500 according to the first embodiment of the present invention. In addition to an upper level CPU (outside CPU) 1, the configuration also includes an inside CPU 22 provided inside an IC chip 2 which serves as one of the main parts of the wireless LAN apparatus 500. That is, at least a portion of the workload (operations) of the upper level CPU 1 mounted in an image forming apparatus (upper level apparatus, e.g. printer, copy machine) is allotted to the inside CPU 22 in the IC chip 2, to thereby allow the inside CPU 22 to process the workload of the upper level CPU (outside CPU) 1. This significantly reduces the workload of the upper level CPU 1 and prevents an excess workload from being applied to the upper level CPU 1 of the image forming apparatus (which usually has a lower processing performance than that of a personal computer, for example) in a case where, for example, a wireless LAN function is added.

In FIG. 3, the wireless LAN apparatus 500 includes the IC chip 2 which is connected to the upper level CPU 1 of an image forming apparatus (e.g. printer, copy machine, not shown), an oscillator 3 which transmits clock signals to the IC chip 2, an IC chip 4 which is connected to the IC chip 2, an oscillator 5 which transmits clock signals to the IC chip 4, and an antenna 6. Furthermore, the IC chip 2 includes an outside CPU interface 21 which inputs/outputs signals with respect to the upper level CPU 1, the inside CPU 22 which is provided for reducing the workload of the upper level CPU 1, a MAC processing part 23 which performs media access control (e.g. CSMA/CA), a BB processing part 24 which processes base band signals, and an RF interface 25 which inputs/outputs signals with respect to the IC chip 4. The IC chip 4 includes an RF processing part 41 which processes high frequency signals.

Figure 4:
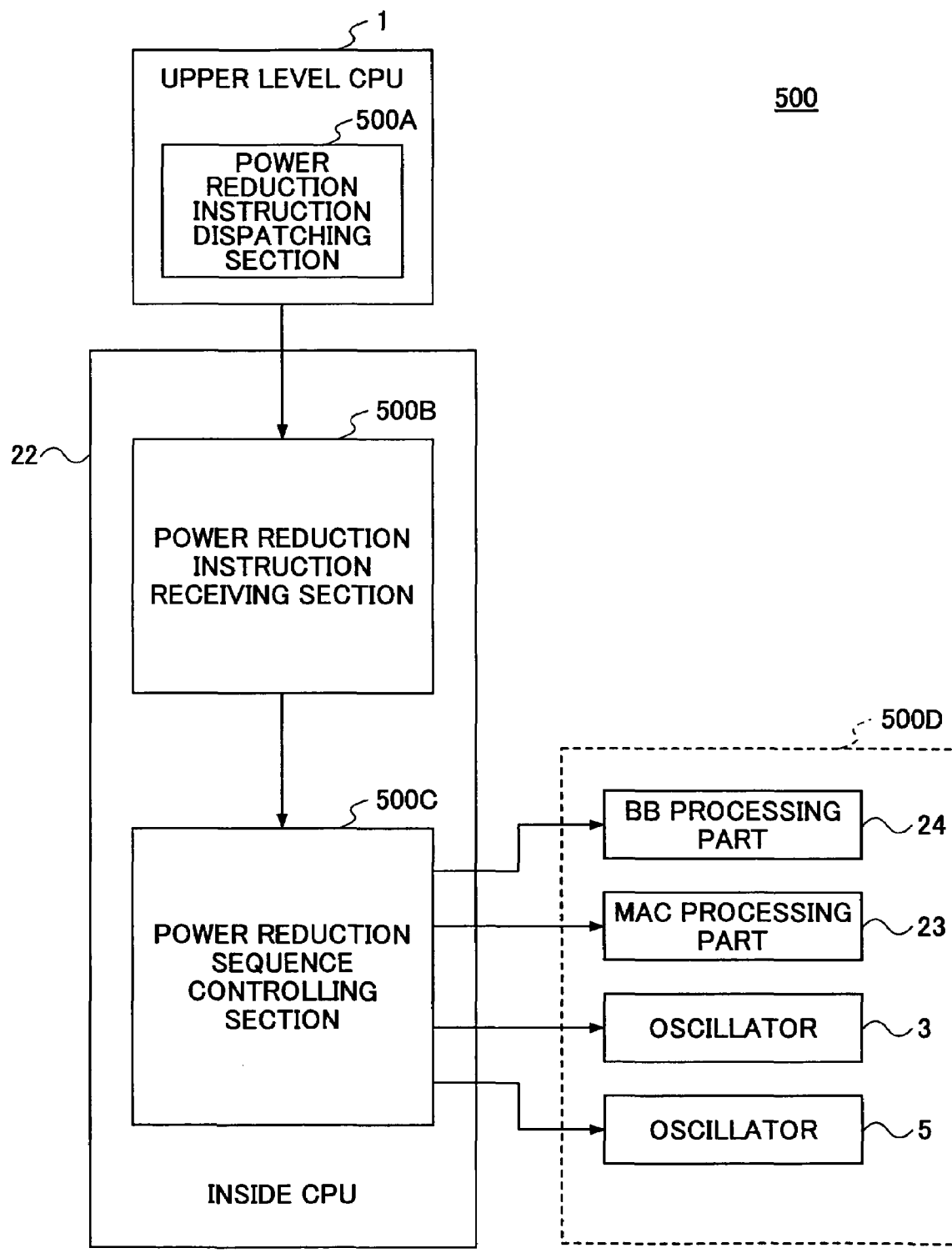
FIG. 4 is a schematic view showing an exemplary arrangement of functional sections for performing a power control operation with a wireless LAN apparatus according to the first embodiment of the present invention.

FIG. 4 is a schematic diagram showing an exemplary arrangement of functional sections for performing a power control operation with the wireless LAN apparatus 500 according to the first embodiment of the present invention. In FIG. 4, a power reduction instruction dispatching section 500A is provided for executing a function of the upper level CPU 1. Furthermore, a power reduction instruction receiving section 500B and a power reduction sequence controlling section 500C are provided for executing functions of the inside CPU 22. Furthermore, a module group section 500D includes the BB processing part 24, the MAC processing part 23, and the oscillators 3, 5.

Figure 5:
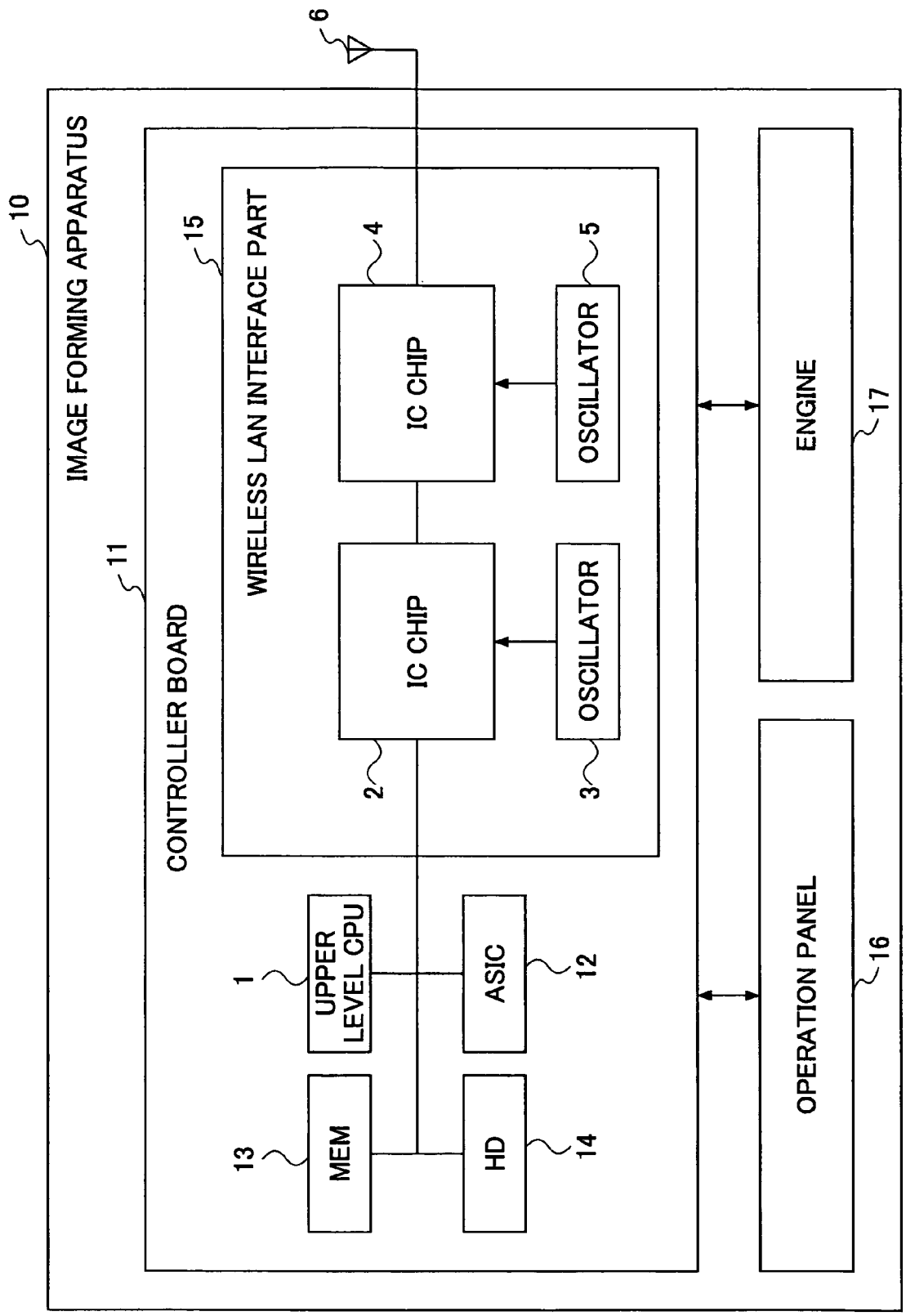
FIG. 5 is a schematic view showing an exemplary configuration of an image forming apparatus including a wireless LAN according to the first embodiment of the present invention.

FIG. 5 is a schematic diagram showing an exemplary configuration of an image forming apparatus 10 (e.g. printer, copy machine) including the wireless LAN apparatus 500 according to the first embodiment of the present invention. In FIG. 5, the image forming apparatus 10 includes a controller board 11 including a function part for performing a controlling operation, an operations panel 16 for receiving input from the user and displaying various operational states, and an engine 17 for performing a printing operation. The controller board 11 includes: the upper level CPU 1 for performing the main controlling operations of the image forming apparatus 10; a memory part 13 that includes a ROM (Read Only Memory) for storing fixed data/programs therein, and a RAM (Random Access Memory) serving as a work area; a hard disk part 14 for storing, for example, application programs and printing data; an ASIC (Application Specific Integrated Circuit) 12 for performing an image processing operation; and a wireless LAN interface part 15 including the IC chips 2, 4, and the oscillators 3, 5 and having an antenna 6 connected thereto.

Figure 6:
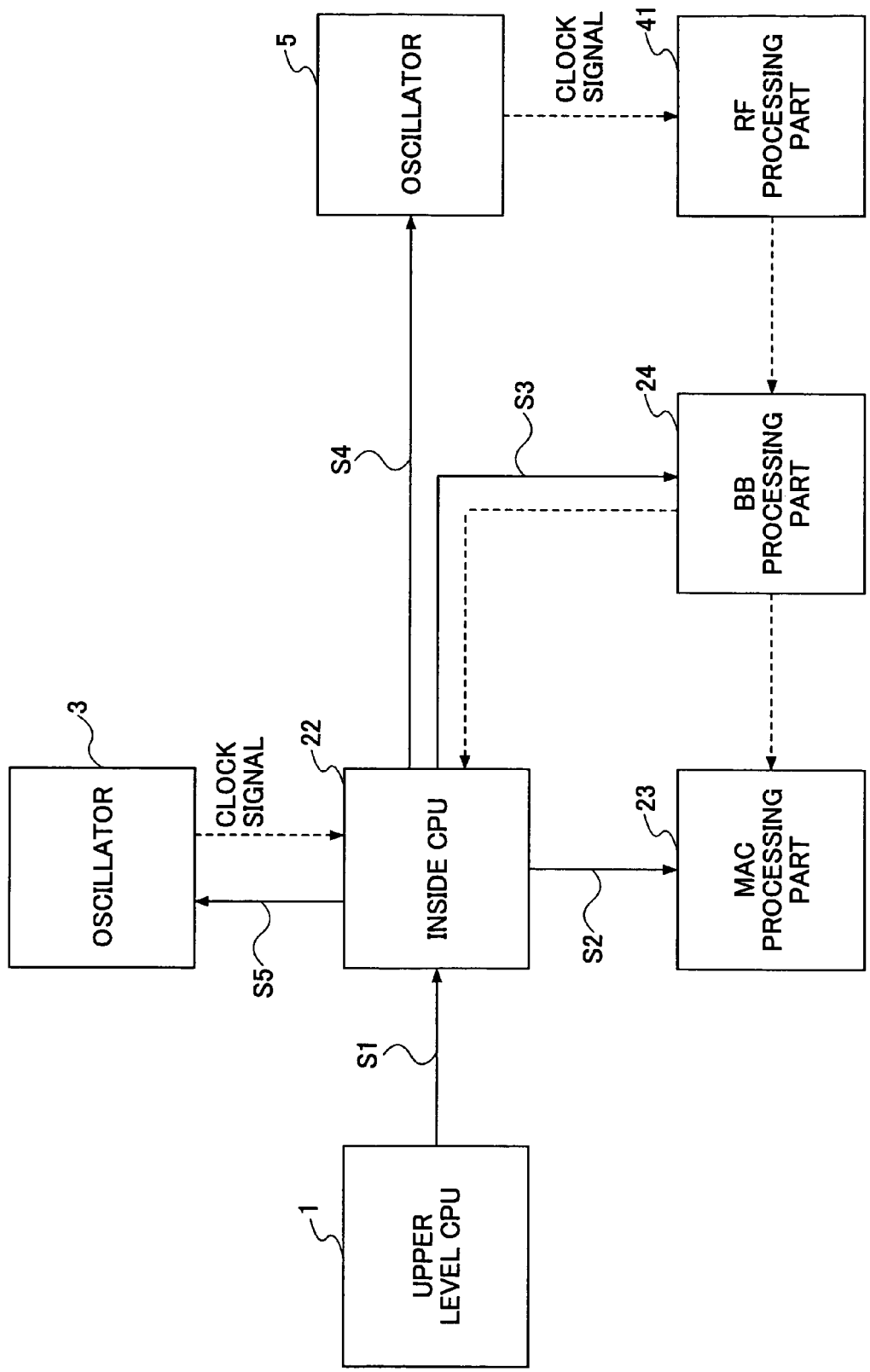
FIG. 6 is a schematic view showing the flow of a power reduction process according to the first embodiment of the present invention.

FIG. 6 shows the flow of a power reduction process that is cooperatively performed by the power reduction instruction dispatching section 500A, the power reduction instruction receiving section 500B, and the power reduction sequence controlling section 500C according to the first embodiment of the present invention. In FIG. 6, the upper level CPU 1 dispatches a power reduction instruction to the inside CPU 22 by using the function of the power reduction instruction dispatching section 500A (See FIG. 4) when a predetermined power reduction condition is satisfied (e.g. when the wireless LAN is unused for a predetermined period or when reaching a predetermined time) (Step S1). When the inside CPU 22 receives the power reduction instruction by using the function of the power instruction receiving section 500B, the inside CPU 22 switches off the power of the MAC processing part 23 and the BB processing part 24 (switched to a "power down state") by using the function of the power reduction sequence controlling section 500C (Steps S2 and S3).

Next, the inside CPU 22 stops the oscillator 5 by using the function of the power reduction sequence controlling section 500C (Step S4). This prevents clock signals from being transmitted from the RF processing part 41 to the BB processing part 24. However, since the RF processing part 41 is still operable to receive wireless signals, other modules can be restored (activated from the power down state) upon receiving wireless signals. Next, the inside CPU 22 stops the oscillator 3 from transmitting clock signals to itself (i.e. stops the transmittal of clock signals from the oscillator 3 to the inside CPU 22) (Step S5) and switches off or reduces its own power (i.e. the power of the inside CPU 22).

Accordingly, the power of each module can be reduced (turned to the power down state) in a step-by-step manner and the transition to a minimal power state can be achieved while being able to receive wireless signals.

Figure 7:
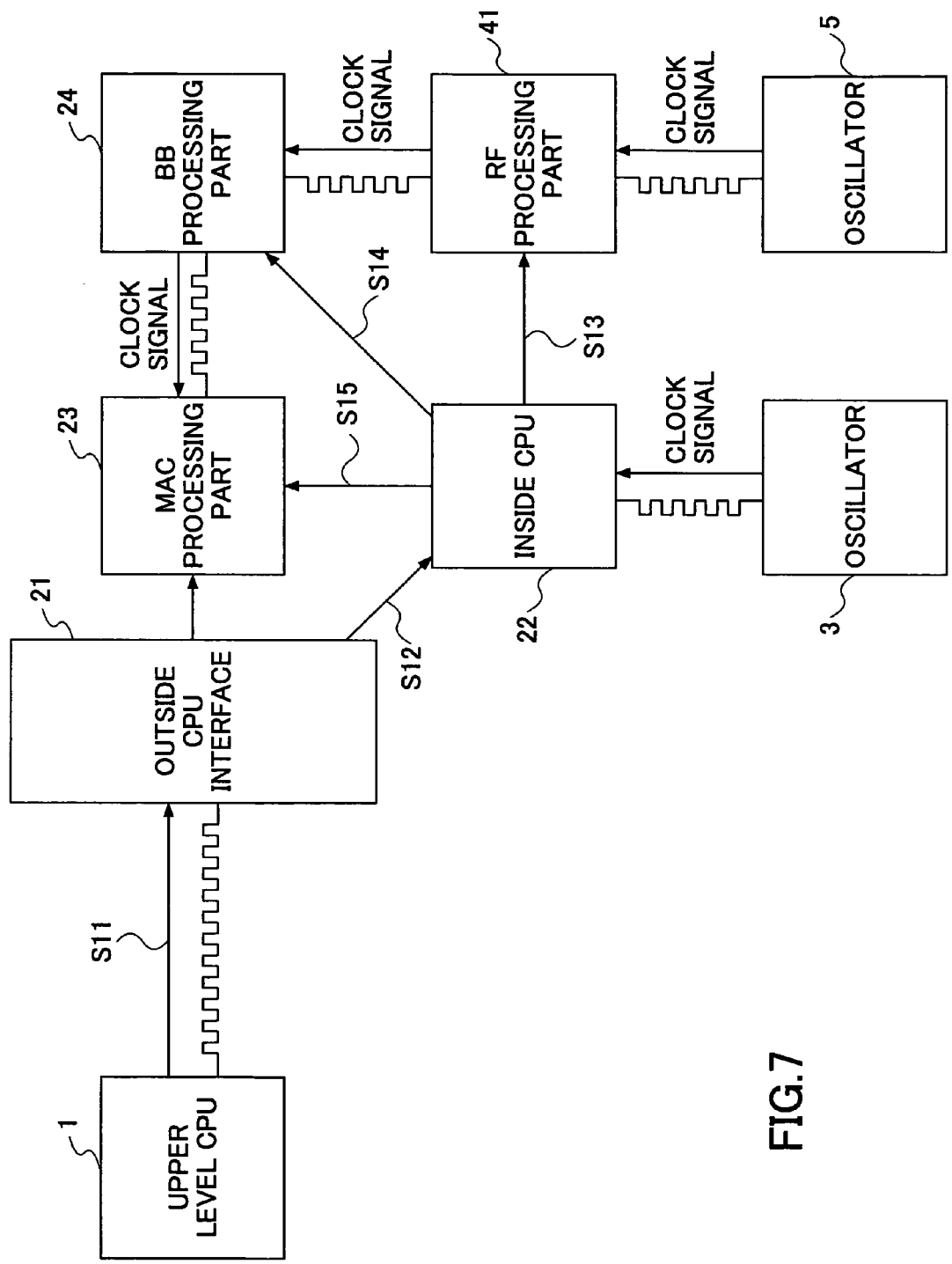
FIG. 7 is a schematic view showing the flow of a power restoration process according to the first embodiment of the present invention.

FIG. 7 shows the flow of a process for restoring (reactivating) the power from the power down state according to the first embodiment of the present invention. In FIG. 7, the upper level CPU 1 is in an operational state while the other modules are in an inactive state or at least in a power reduced state. First, in the activating process, the upper level CPU 1 activates the oscillator 3 through the outside CPU interface 21 and the inside CPU 22 (Steps S11 and S12, respectively). Accordingly, the activated oscillator 3 activates the inside CPU 22 by transmitting clock signals to the inside CPU 22. Then, the inside CPU 22 activates the oscillator 5 through the RF processing part 41 (Step S13) and also activates the BB processing part 24 and the MAC processing part 23 (Steps S14 and S15, respectively). Accordingly, the activated oscillator 5 transmits clock signals to the RF processing part 41; then the RF processing part 41 transmits clock signals to the BB processing part 24; and then the BB processing part 24 transmits clock signals to the MAC processing part 23. Thereby, the entire system returns to a regular operational state.

Figure 8:
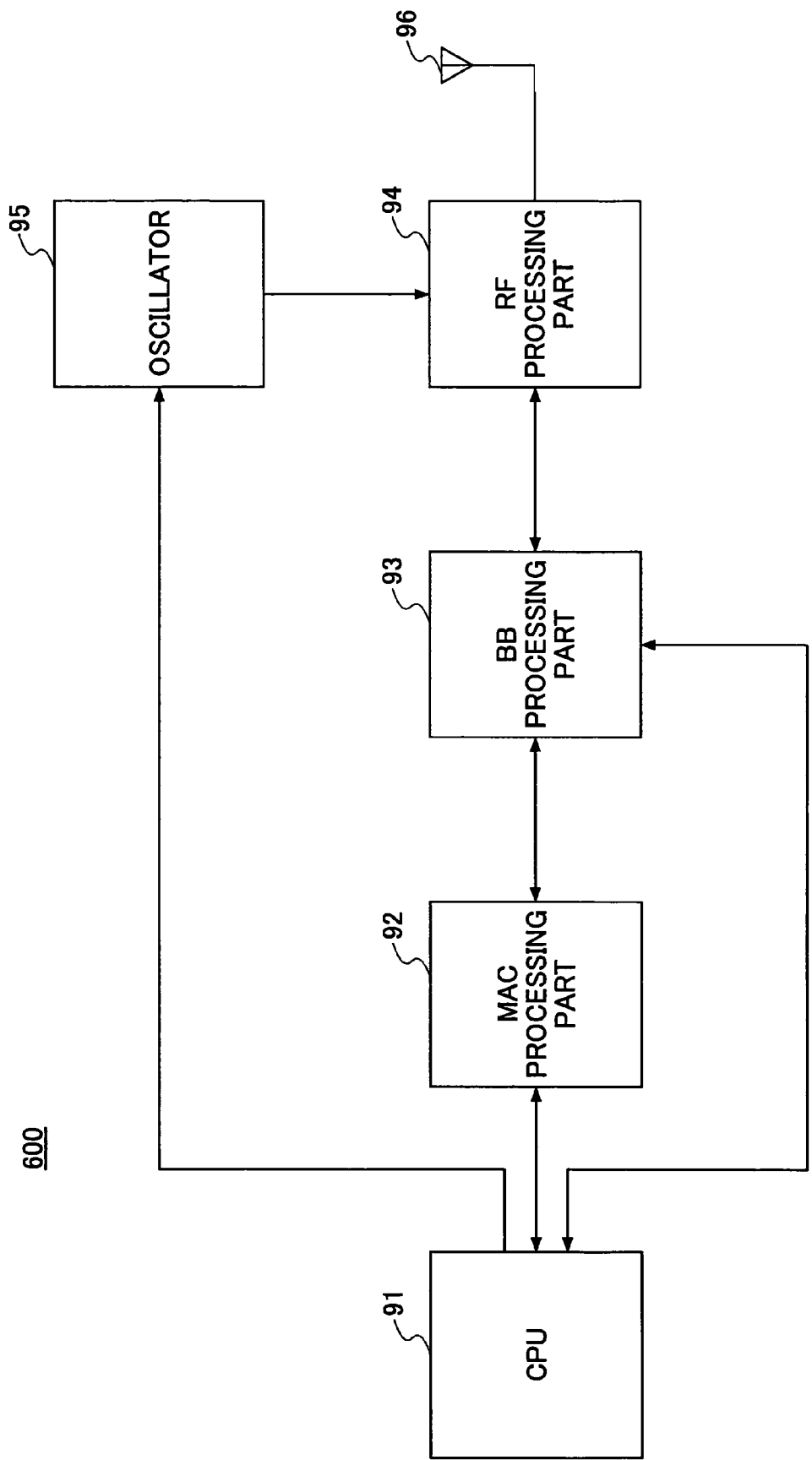
FIG. 8 is a schematic view showing an exemplary configuration of a wireless LAN apparatus according to the second embodiment of the present invention.

Next, a wireless LAN apparatus 600 according to the second embodiment of the present invention is described with reference to FIG. 8. The wireless LAN apparatus 600 according to the second embodiment of the present invention (unlike the wireless LAN apparatus 500 according to the first embodiment of the present invention) does not include an inside CPU provided in a chip. It is to be noted that the modules of the wireless LAN apparatus 600 according to the second embodiment of the present invention may be fabricated, for example, as an IC chip or as discrete components (separate components). As shown in FIG. 8, the wireless LAN apparatus 600 includes a CPU 91 included in an upper level apparatus (e.g. printer, copy machine), a MAC processing part 92 that performs a media access control operation (e.g. CSMA/CA), a BB processing part 93 that processes base band signals, an RF processing part 94 that processes high frequency signals, an oscillator 95 that transmits clock signals to the RF processing part 94, and an antenna 96 connected to the RF processing part 94.

Figure 9:
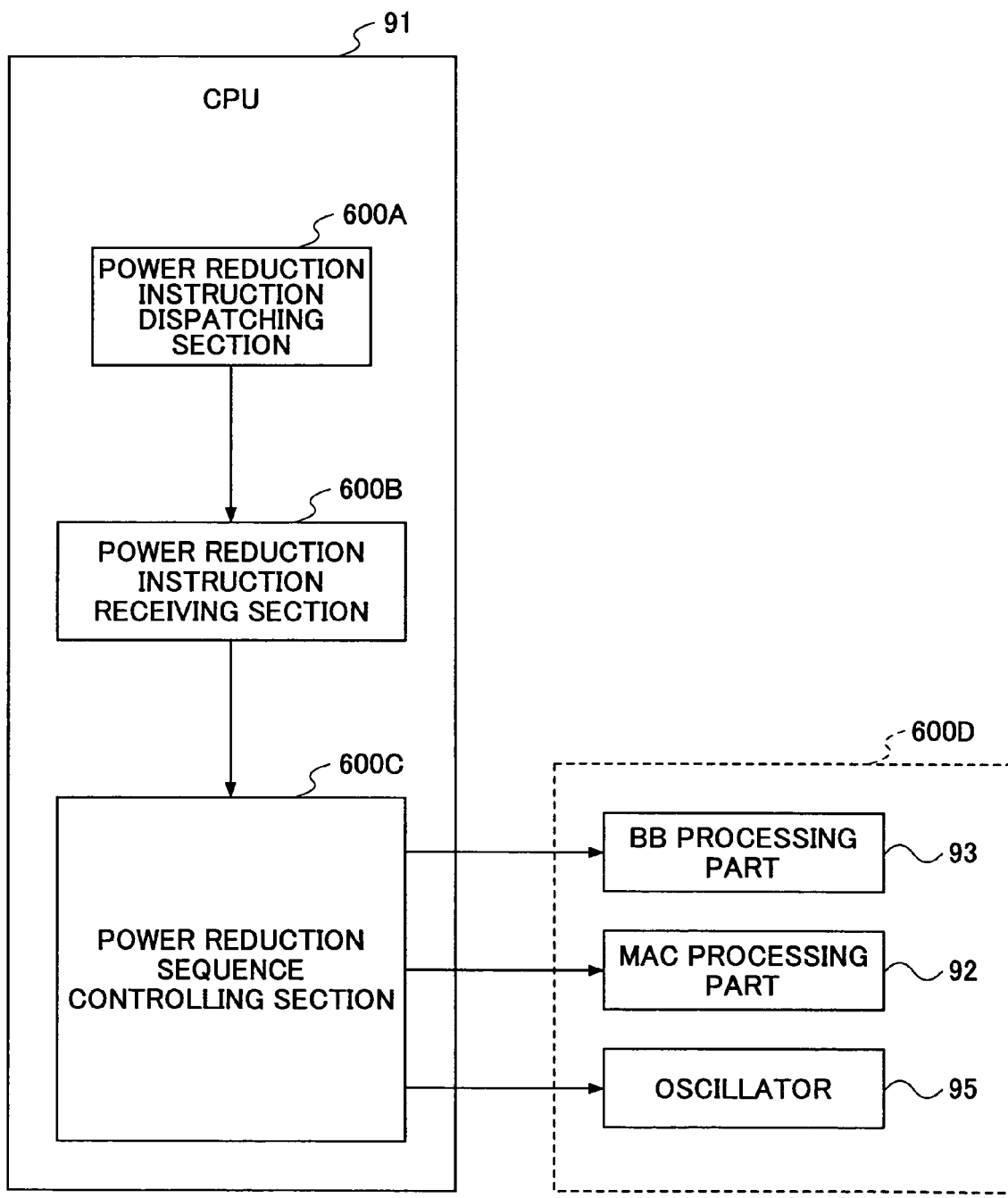
FIG. 9 is a schematic view showing an exemplary arrangement of functional sections for performing a power control operation with a wireless LAN apparatus according to the second embodiment of the present invention.

FIG. 9 is a schematic diagram showing an exemplary arrangement of functional sections for performing a power control operation with the wireless LAN apparatus 600 according to the second embodiment of the present invention. In FIG. 9, a power reduction instruction dispatching section 600A, a power reduction instruction receiving section 600B and a power reduction sequence controlling section 600C are provided for executing the functions of the CPU 91. Furthermore, a module group section 600D includes the BB processing part 93, the MAC processing part 92, and the oscillator 95.

Figure 10:
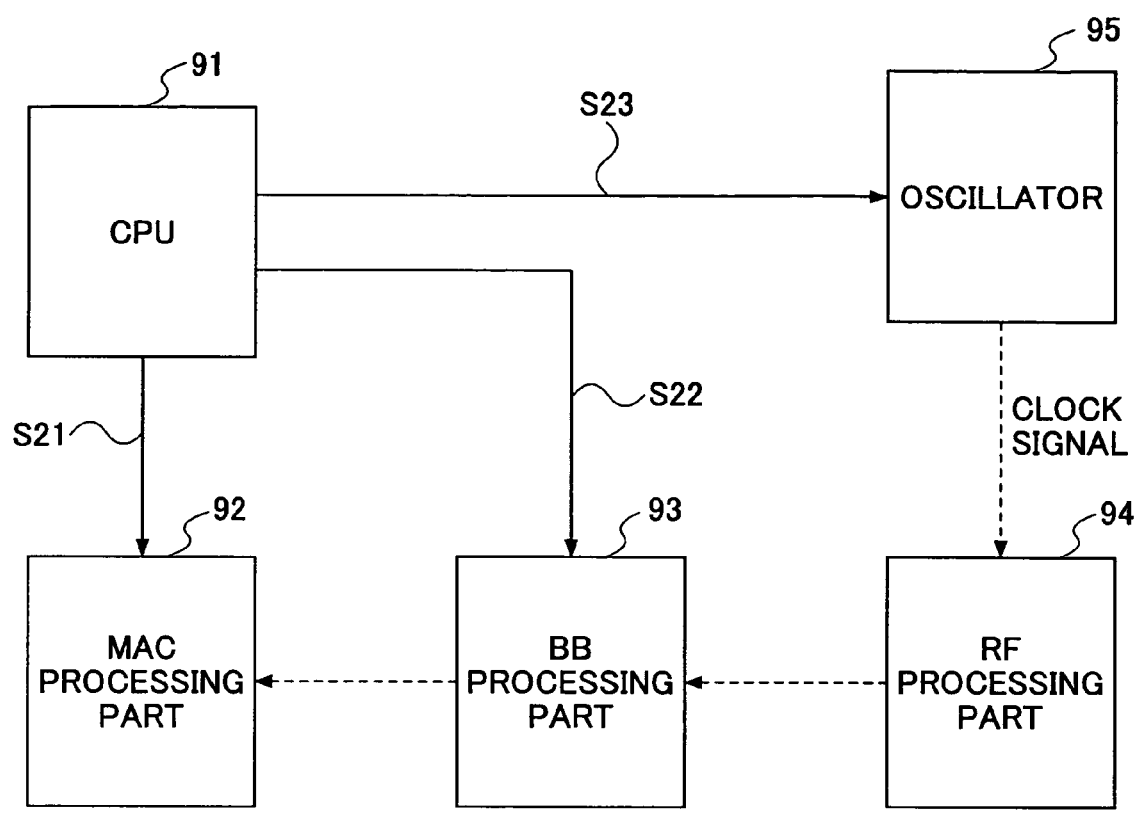
FIG. 10 is a schematic view showing the flow of a power reduction process according to the second embodiment of the present invention.

FIG. 10 shows the flow of a power reduction process that is cooperatively performed by the power reduction instruction dispatching part 600A, the power reduction instruction receiving part 600B, and the power reduction sequence controlling part 600C according to the second embodiment of the present invention. In FIG. 10, the power reduction instruction dispatching section 600A (See FIG. 9) in the CPU 91 dispatches a power reduction instruction when a predetermined power reduction condition is satisfied (e.g. when the wireless LAN is unused for a predetermined period or when reaching a predetermined time). When the power reduction instruction receiving section 600B (See FIG. 9) in the CPU 91 receives the dispatched power reduction instruction, the power reduction sequence controlling section 600C (See FIG. 9) in the CPU 91 switches off or at least reduces the power of the MAC processing part 92 and the BB processing part 93 (switched to a "power down state") (Steps S21 and S22). Then, the power reduction sequence controlling section 600C in the CPU 91 stops the oscillator 95 (Step S23). This prevents clock signals from being transmitted from the RF processing part 94 to the BB processing part 93. However, since the RF processing part 94 is still operable to receive wireless signals, other modules can be restored (activated from the power down state) upon receiving wireless signals.

Figure 11:
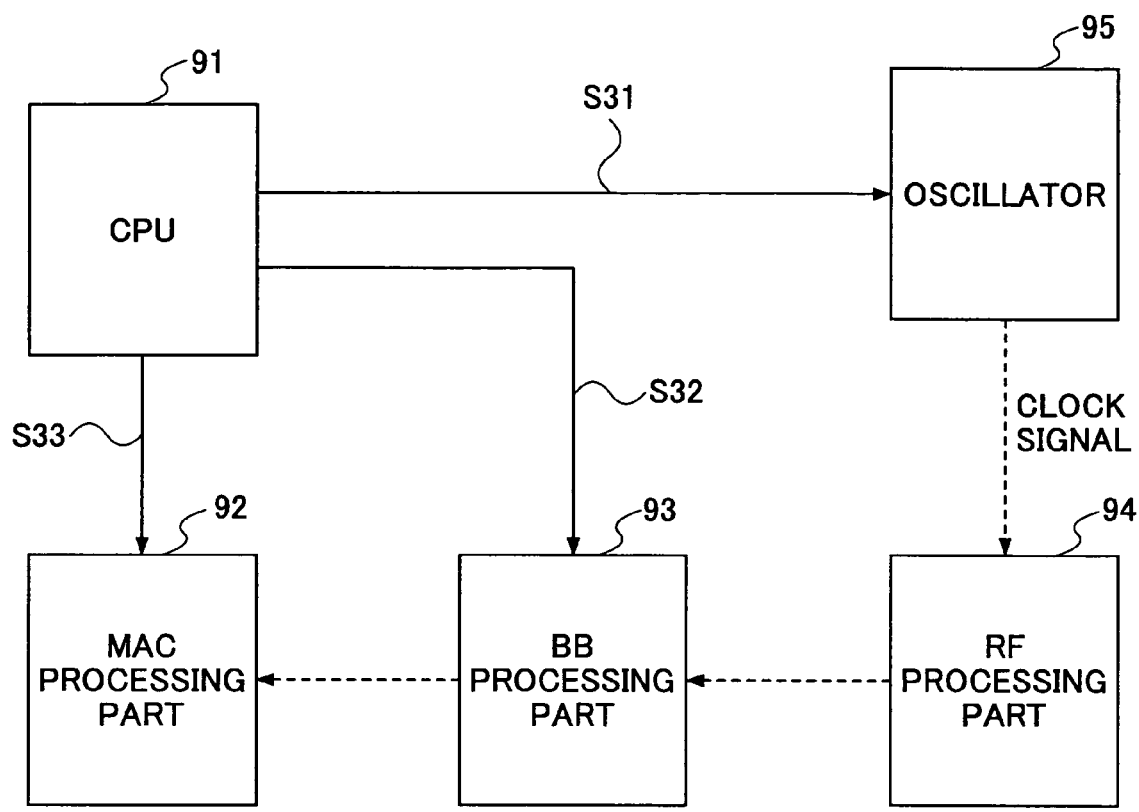
FIG. 11 is a schematic view showing the flow of a power restoration process according to the second embodiment of the present invention.

FIG. 11 shows the flow of a process for restoring (activating) the power from the power down state according to the second embodiment of the present invention. In FIG. 11, the CPU 91 is in an operational state while the other modules are in an inactive state or at least in a power reduced state. In the activating process, the CPU 91 activates the oscillator 95 (Step S31) and also activates the BB processing part 93 and the MAC processing part 92 (Steps S32 and S33, respectively). Accordingly, the activated oscillator 95 transmits clock signals to the RF processing part 94; then the RF processing part 94 transmits clock signals to the BB processing part 93; and then the BB processing part 93 transmits clock signals to the MAC processing part 92. Thereby, the entire system returns to a regular operational state.

Further, the present invention is not limited to these embodiments, but various variations and modifications may be made without departing from the scope of the present invention.

The present application is based on Japanese Priority Application No. 2004-328130 filed on Nov. 11, 2004, with the Japanese Patent Office, the entire contents of which are hereby incorporated by reference.

What is claimed is:

1. A wireless LAN apparatus comprising:
a module group section that is connected to an upper level CPU of an upper level apparatus;
an RF processing part that is connected to the module group section;
a power reduction instruction dispatching section for dispatching a power reduction instruction;
a power reduction instruction receiving section for receiving the power reduction instruction dispatched from the power reduction instruction section;
a power reduction sequence controlling section for controlling power of the module group section in a predetermined order in accordance with the power reduction instruction dispatched by the power reduction instruction dispatching section; and
wherein the module group section includes a BB processing part for processing base band signals and the power reduction instruction includes the BB processing part as part of the predetermined order.

2. The wireless LAN apparatus as claimed in claim 1, wherein the module group section is included in an IC chip having
a MAC processing part for conducting media access control,
the BB processing part for processing base band signals, and
an inside CPU for processing a portion of the workload of the upper level CPU.

3. The wireless LAN apparatus as claimed in claim 2, wherein the upper level CPU is configured to function as the power reduction instruction dispatching section, wherein the inside CPU is configured to function as the power reduction instruction receiving section and the power reduction sequence controlling section.

4. The wireless LAN apparatus as claimed in claim 3, wherein the module group section further includes
a first oscillator for transmitting a first oscillator clock signal to the inside CPU, and
a second oscillator for transmitting a second oscillator clock signal to the RF processing part.

5. The wireless LAN apparatus as claimed in claim 1, wherein the module group section includes a MAC processing part for conducting media access control.

6. The wireless LAN apparatus as claimed in claim 5, wherein the upper level CPU is configured to function as the power reduction instruction dispatching section, the power reduction instruction receiving section and the power reduction sequence controlling section.

7. The wireless LAN apparatus as claimed in claim 6, wherein the module group section further includes an oscillator for transmitting a clock signal to the RF processing part.

8. A wireless LAN apparatus comprising:
a module group section that is connected to an upper level CPU of an upper level apparatus;
an RF processing part that is connected to the module group section;
a power reduction instruction dispatching section for dispatching a power reduction instruction;
a power reduction instruction receiving section for receiving the power reduction instruction dispatched from the power reduction instruction section;
a power reduction seciuence controlling section for controlling power of the module group section in a predetermined order in accordance with the power reduction instruction dispatched by the power reduction instruction dispatching section;

wherein the module group section is included in an IC chin having a MAC processing part for conducting media access control, a BB processing part for processing base band signals, an inside CPU for processing a portion of the workload of the upper level CPU, a first oscillator for transmitting a first oscillator clock signal to the inside CPU, and a second oscillator for transmitting a second oscillator clock signal to the RF processing part;

wherein the upper level CPU is configured to function as the power reduction instruction dispatching section, wherein the inside CPU is configured to function as the power reduction instruction receiving section and the power reduction sequence controlling section; and wherein the power reduction sequence controlling section reduces the power of the MAC processing part, the BB processing part, the inside CPU, the first oscillator, and the second oscillator in an order of the MAC processing part, the BB processing part, the second oscillator, the first oscillator, and the inside CPU.

9. The wireless LAN apparatus as claimed in claim 8, wherein the power reduction sequence controlling section restores the power of the MAC processing part, the BB processing part, the inside CPU, the first oscillator, and the second oscillator in an order of the first oscillator, the inside CPU, the second oscillator, the BB processing part, and the MAC processing part.

10. A wireless LAN apparatus comprising:
   a module group section that is connected to an upper level CPU of an upper level apparatus;
   an RF processing part that is connected to the module group section;
   a power reduction instruction dispatching section for dispatching a power reduction instruction;
   a power reduction instruction receiving section for receiving the power reduction instruction dispatched from the power reduction instruction section;
   a power reduction secinence controlling section for controlling power of the module group section in a predetermined order in accordance with the power reduction instruction dispatched by the power reduction instruction dispatching section;
   wherein the module group section includes a MAC processing part for conducting media access control, a BB processing part for processing base band signals, and an oscillator for transmitting a clocks signal to the RF processing part;

wherein the upper level CPU is configured to function as the power reduction instruction dispatching section, the power reduction instruction receiving section and the power reduction seciuence controlling section; and wherein the power reduction sequence controlling section reduces the power of the MAC processing part, the BB processing part, and the oscillator in an order of the MAC processing part, the BB processing part, and the oscillator.

11. The wireless LAN apparatus as claimed in claim 10, wherein the power reduction sequence controlling section restores the power of the MAC processing part, the BB processing part, and the oscillator in an order of the oscillator, the BB processing part, and the MAC processing part.

12. A semiconductor device used for a wireless LAN apparatus including a power reduction function, the semiconductor device comprising:
   a power reduction instruction receiving section for receiving a power reduction instruction dispatched from the wireless LAN apparatus;
   a power reduction sequence controlling section for controlling power of a module group section included in the wireless LAN apparatus in a predetermined order in accordance with the power reduction instruction dispatched by the power reduction instruction dispatching section; and
   wherein the module group section includes a BB processing part for processing base band signals and the power reduction instruction includes the BB processing part as part of the predetermined order.

13. The semiconductor device as claimed in claim 12, further comprising:
   a MAC processing part for conducting media access control, and
   an inside CPU for processing a portion of the workload of an upper level CPU of an upper level apparatus connected to the wireless LAN apparatus.

* * * * *